Nov. 18, 1958     F. SALDITT     2,861,006
ADHESIVE TAPE AND METHOD OF MAKING THE SAME
Filed Feb. 19, 1957     2 Sheets-Sheet 1
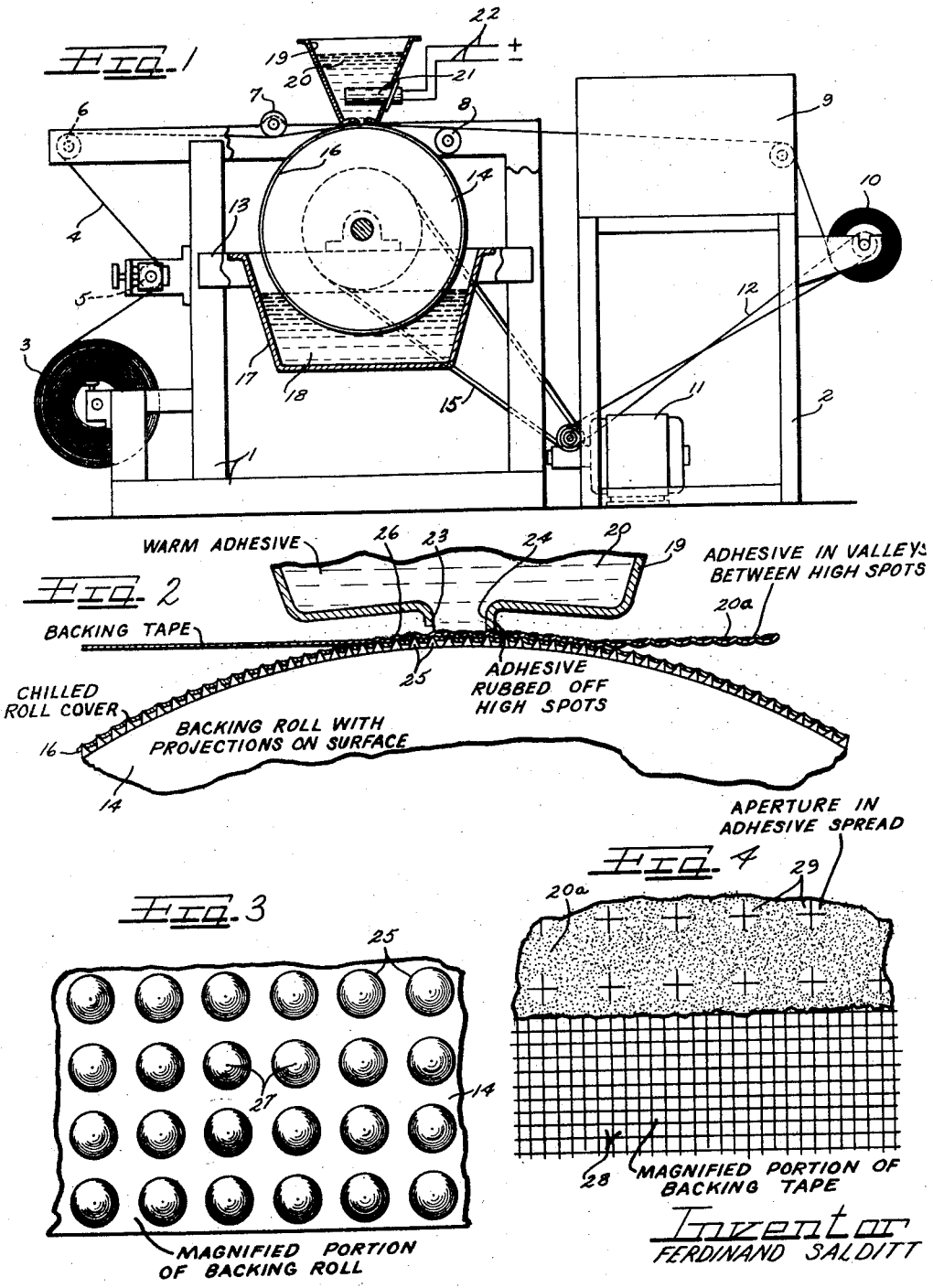
Inventor
FERDINAND SALDITT Nov. 18, 1958           F. SALDITT           2,861,006
ADHESIVE TAPE AND METHOD OF MAKING THE SAME
Filed Feb. 19, 1957           2 Sheets-Sheet 2
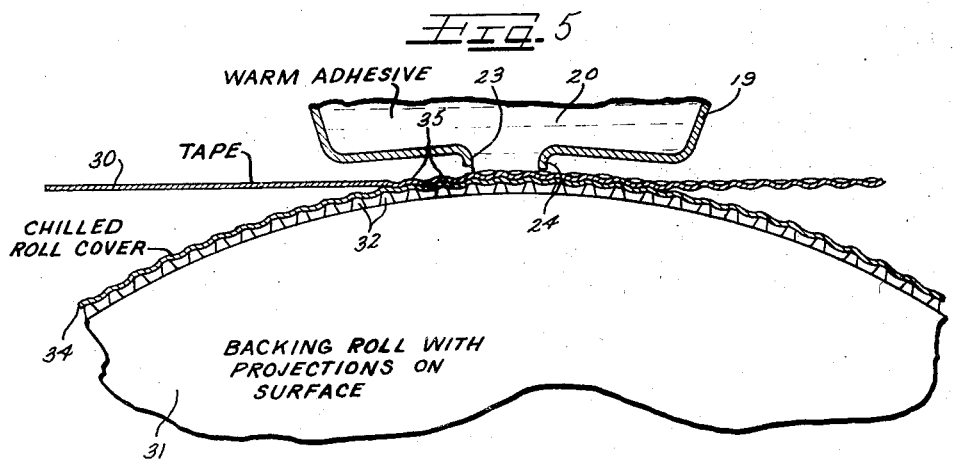
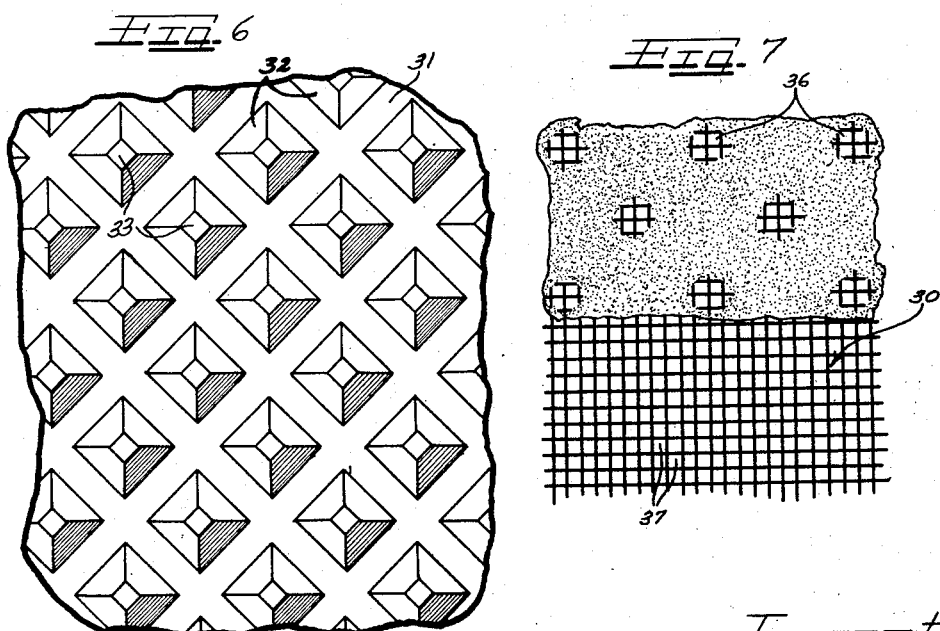
Inventor
FERDINAND SALDITT

United States Patent Office 2,861,006
Patented Nov. 18, 1958

2,861,006

ADHESIVE TAPE AND METHOD OF MAKING THE SAME

Ferdinand Salditt, Neuwied (Rhine), Germany, assignor to The Scholl Mfg. Co., Inc., Chicago, Ill., a corporation of New York Application February 19, 1957, Serial No. 641,095

10 Claims. (Cl. 117—7)

This invention relates to improvements in adhesive tape and a method of making the same, and more particularly to an adhesive tape that is porous or pervious to air and is highly desirable for application to the human body as a medicinal or surgical tape, although the tape may be used as a masking tape and for other industrial or mechanical purposes if so desired, as will be more apparent to one skilled in the art.

The instant application is a continuation-in-part of my copending application entitled "Adhesive Tape and Method of Making the Same," filed August 4, 1951, Serial No. 240,333, now abandoned, which said copending application is a division of my previous application, then copending, entitled "Apparatus for Making Adhesive Tape," filed April 27, 1950, Serial No. 158,524, now issued in Patent No. 2,646,771.

In the past, many various types of adhesive tape both for medicinal or surgical use, as well as for industrial purposes, have been developed, but in most cases such tapes comprised a backing strip or sheet with substantially a uniform layer of adhesive mass or spread over one face thereof, and neither the spread nor the mass was pervious to air. It is well known that medicinal or surgical adhesive tape of the nonporous character as heretofore known is extremely irritating to certain patients having sensitive skins, and if the tape was applied for a substantial length of time, open sores and infection underneath the applied tape frequently resulted. Such irritation, sores, or infection would be eliminated to a considerable extent if the tape were porous or pervious to air. Likewise, the particular affliction the tape was designed to protect would, in many cases, heal more rapidly if air could reach the affliction. It is also known that under certain mechanical or industrial conditions, an air pervious tape is desirable. Attempts have heretofore been made to provide porous tape, but in all instances of which I am aware, those attempts did not provide a really satisfactory as well as sanitary porous tape. Adhesive tape has heretofore been punched to provide numerous holes therein, but that requires a cold mass and pieces are actually cut out of both the backing and the mass, so that there is open exposure of the affliction at the punched holes but the tape is not porous elsewhere. Other endeavors embodied the application of unporous masses of adhesive at relatively widely separated points, but such tape did not adhere to the desired degree, and was not porous especially in overlapping sections, and could be produced only at relatively and objectionably great expense.

With the foregoing in mind, it is an important object of the instant invention to provide an adhesive tape that is more uniformly porous to air throughout its entire area, both as to the backing and the adhesive spread thereon, than any porous tape known heretofore.

Another object of the invention resides in the provision of a porous adhesive tape embodying a naturally porous backing sheet with an adhesive spread thereon, substantially uniformly distributed, but having numerous openings equivalent to apertures therein.

It is also an object of this invention to provide an air porous adhesive tape wherein the backing is naturally porous by way of minute interstices therein, and the adhesive spread on one face of that backing is provided during the manufacture of the tape, with openings or apertures in the spread, each of which is of an area equivalent to a section of backing having a plurality of pores therein.

A further feature of the instant invention resides in the provision of an air porous adhesive tape wherein the backing is naturally porous by virtue of possessing minute pores therein, and the adhesive spread itself is provided with larger apertures than the pores of the fabric, whereby the large aperture in the adhesive provides air circulation over that covered by the adhesive, and the finer backing protects the surface covered against the entry of dirt or other contaminating material.

Still another feature of the instant invention resides in the provision of a porous adhesive tape which may utilize either a stretchable or a non-stretchable backing, and wherein the backing is naturally porous while the adhesive spread or mass is provided with apertures therein during the manufacture of the tape.

A further object of the instant invention resides in the provision of a porous adhesive tape comprising a finely woven backing having minute pores between the threads thereof, and an adhesive mass which is alone provided with numerous apertures therein while the backing remains in an unpierced condition.

The instant invention also seeks the provision of a new and novel method of making a porous adhesive tape.

Another object of the invention resides in the provision of a method of making a porous adhesive tape, wherein an adhesive spread is applied to a naturally porous backing sheet, and then the spread is set with sufficient rapidity to provide and retain apertures or openings in the spread or mass itself.

It is also an object of this invention to provide a new and novel method of making a porous adhesive tape embodying the steps of applying a relatively soft adhesive mass to one face of a naturally porous backing and contemporaneously deviating the surface of the backing to provide numerous high spots which will be devoid of adhesive in the application of the mass, and then setting the adhesive with sufficient rapidity to retain the apertures provided at the high spots, even when the backing is restored to its originally flat condition.

Still another object of the instant invention is the provision of a method of making a porous adhesive tape embodying the steps of applying a mass of softened adhesive and relatively warm adhesive to one face of the tape-like backing, that is naturally porous, contemporaneously forming apertures in the adhesive mass itself, leaving the backing unpierced, and then chilling the applied adhesive with sufficient rapidity to retain the apertures therein.

While some of the more salient features, characteristics and advantages of the instant invention have been above pointed out, others will become apparent from the following disclosures, taken in conjunction with the accompanying drawings, in which Fig. 1 is a fragmentary part elevational and part vertical sectional view of the tape making apparatus capable of performing the method embodied in the instant invention, and making the tape embodied in this invention;

Fig. 2 is an enlarged fragmentary vertical sectional view of the structure seen in the upper central portion of Fig. 1, illustrating the application of the adhesive mass to the backing;

Fig. 3 is a magnified fragmentary face view of the backing roll of Fig. 2;

Fig. 4 is a fragmentary greatly magnified face view of the resultant tape looking at the adhesived side thereof, with a portion of the adhesive broken away to illustrate the fabric therebehind;

Fig. 5 is a view similar in character to Fig. 2, but illustrating a slightly different form of apparatus;

Fig. 6 is a magnified fragmentary face view of the backing roll of Fig. 5; and

Fig. 7 is a fragmentary and greatly magnified face view of the tape resulting from the apparatus of Fig. 5, seen from the adhesive side thereof with a part of the adhesive broken away to illustrate the backing material therebeneath.

As shown in the drawings:

Briefly, the method embodied in the instant invention consists of the steps of moving a naturally porous backing material continuously along a predetermined path, applying softened adhesive to one face of that backing material, doctoring the adhesive as it is applied so as to provide a mass or spread upon the backing with numerous spots substantially devoid of adhesive, and contemporaneously setting the adhesive with sufficient rapidity to provide and maintain apertures at the aforesaid spots, thus providing a resultant adhesive tape substantially uniformly porous throughout. With this method of manufacture, both economy and efficiency are present, and the resulting adhesive tapes are highly desirable for medical or surgical use, and at the same time the resultant tape may be made considerably thinner and possess at least the same bandaging and adhering characteristics of non-porous surgical adhesive tape heretofore known, and which is relatively thick.

In order to clarify the practice of the instant invention, applicant has illustrated herein certain embodiments of apparatus capable of performing the method, such particular apparatus being more fully set forth, described and claimed in my aforesaid parent application now issued in Patent No. 2,646,771.

For purposes of clarity, the method will be described first herein, and then the adhesive tape itself.

The mechanism illustrated in Fig. 1 embodies a suitable main frame 1 with an auxiliary frame 2 thereadjacent. On an offset portion of the main frame, a backing supply roll 3 is mounted for free rotation, and from this roll a strip or sheet of backing material of indefinite length passes through the machine.

As the sheet or strip 4 leaves the supply roll 3, it passes over a suitable tensioning roll 5 mounted on an intermediate portion of the frame, and then over a guide roll 6, under a guide roll 7, over a guide roll 8, through a suitable tunnel 9 containing any desirable form of drying apparatus, and after leaving the tunnel, the finished adhesive tape is wound upon a receiving roll 10 mounted on the auxiliary frame 2. This receiving roll 10 is preferably driven from a suitable source of power such as an electric motor 11, by way of a belt or equivalent means 12. The guide rolls 6, 7 and 8 are mounted along the open bed of the machine, and are disposed below, above, and below the sheet 4, respectively.

Suitably mounted on an intermediate support 13 of the frame 1 is a relatively large drum 14 rotated by means of a suitable belt 15 or the like from the aforesaid power unit 11. The drum is preferably provided with a covering 16 of fabric or other suitable material capable of absorbing and carrying moisture, such as water. As seen clearly in Fig. 1, the drum rotates in an open topped vat 17 mounted therebelow, and which may contain a quantity of cooling liquid 18 such as cold water.

Disposed above the open bed of the machine is an adhesive supply hopper 19 containing a mass of soft adhesive 20 which is preferably kept at a suitable elevated temperature by means of a heating unit 21 that may extend into the hopper as illustrated, be disposed therearound, or positioned in any other satisfactory location. The heating unit may be of the electrical type, and may be energized through conductors 22 leading to any suitable source of current.

With reference more particularly to Fig. 2, it will be seen that the hopper 19 is provided with a flanged opening in the bottom, as indicated at 23, and the flange on the trailing side of this opening in the direction of travel of the sheet 4 is extended to form in effect a doctor blade 24 to insure a proper application of adhesive 20 to the sheet 4, as indicated at 20a. The adhesive spread 20a may satisfactorily be as low as 0.2 mm. in thickness.

Now with reference to Fig. 2, it will be seen that the drum 14 is provided with numerous relatively sharp pointed projections 25 distributed substantially evenly but in spaced relationship over the entire outer surface of the drum. These projections or points may punch completely through the absorbent covering 16 so that they contact the backing sheet 4 through the absorbent covering, but they do not punch through the backing sheet. That backing sheet remains in an unpierced condition. Looking again at Fig. 1, it will be seen that the low point of the guide roll 7 and the top point of the guide roll 8 are in a line below the high point of the drum 14, so that there is a positive contact over the top curvature of the drum by the backing 4. Thus, the projections 25 on the surface of the drum cause deviations 26 in the backing sheet 4, and the height of each deviation or high spot is such as to afford at least a light contact with the doctor blade 24, so that at each high spot on the backing 4 substantially no adhesive will be applied, but the adhesive will occupy the entire surface between the high spots, as seen in the righthand portion of Fig. 2.

Contemporaneously with the application of the relatively hot adhesives to the upper face of the backing sheets 4, the underside of the backing sheet is chilled by virtue of the cooling liquid carried by the absorbent drum cover 16. That sudden chilling is of course effective on the adhesive mass, and prevents that mass from penetrating more than halfway through the backing sheet 4. Further, this sudden chilling sets the adhesive with such rapidity that the openings or apertures in the adhesive spread caused by the projections 25 on the drum are emphasized and retained in the adhesive mass. In fact, utilizing an adhesive mass of thermoplastic constituents results in an actual contraction of the mass into definite openings when the projections 25 on the drum deviate the backing, as indicated at 26. The resultant effect is that the mass is perforated, but not by any penetrating means. At the same time, the backing retains its initial and normal condition.

The projections 25 on the drum 14 may be of substantially any desirable shape, and in this particular instance I have illustrated them as being round with fairly sharp points 27, as best seen in Fig. 3, although as later described herein the projections may be pyramidal, or of various other shapes. The particular shape of the aperture in the adhesive mass provided by such projections is not material.

In Fig. 4, I have endeavored to illustrate the finished adhesive tape as well as the backing sheet 4. Any suitable air pervious material may be utilized for the backing sheet 4, but by way of specific example, and not by way of limitation, a very satisfactory substance is a relatively thin finely woven fabric which would possess minute interstices between the adjacent threads thereof. Usually the interstices in the fabric would be microscopic and not visible to the naked eye. The showing in Fig. 4 is a greatly magnified illustration, and the fabric would have interstices as indicated at 28, these interstices or pores being substantially uniformly distributed over the entire backing sheet. On the other hand, the adhesive mass 28 will have apertures therein as indicated at 29 formed as described hereinabove. These apertures, however, will preferably be of materially greater area than the interstices in the backing. Frequently the apertures or openings in the adhesive mass will be such that there will be approximately four pores in the backing material for each aperture in the adhesive mass. In other words, an aperture in the adhesive mass itself is of such area as to be equivalent to an area of backing containing a plurality of pores or interstices. This produces a definite advantage in the finished product, in that the larger pores, and these are also preferably substantially uniformly distributed throughout the adhesive spread, provide adequate ventilation for the body or other element covered by the adhesive tape. When used on the human body, the apertures in the mass are of such size as to provide excellent ventilation, and the interstices in the fabric being smaller and yet more numerous, do not interfere with that ventilation, but at the same time they will filter out minute particles of dirt and other contaminating substances that might reach the affliction under the tape through the larger apertures in the adhesive mass.

In order to further aid one skilled in the art to practice the methods involved in this invention and thus produce the finished adhesive tape involved in this invention, I may mention that the adhesive mass may consist satisfactorily of a relatively high molecular weight organic polymer dissolved in an organic polymer of a lower degree of polymerization, or having a lower molecular weight. One specific substance highly suitable for this purpose is a high molecular weight polyvinyl alkyl ether dissolved in a polyvinyl alkyl ether of lower molecular weight. This can be accomplished by dissolving a naturally solid polyvinyl alkyl ether in a liquid or liquefied polyvinyl alkyl ether of a lower molecular weight. In such case, adhesive and rubber-like or semi-elastic properties of the highly polymerized component are permanently conserved in the solution in the lower molecular weight polymer.

Another satisfactory composition for the adhesive mass is a high molecular weight polyisobutylene (known to the trade as "Vistanex") dissolved in a polyisobutylene of lower molecular weight. Polyvinylisobutylether may also be used.

The exemplary substances mentioned above are both high and low molecular weight polymers selected from the class of alkyl hydrocarbon polymers with certain thermoplastic and heat resisting qualities.

After the preparation of the adhesive mass, it may be placed in the hopper 19 of the apparatus illustrated in Fig. 1, and a satisfactory temperature for use with this apparatus would be in a range between 100 and 120° C. While this is not the only satisfactory range of temperatures for the mass, it is one satisfactory range which, upon being applied to the backing and suddenly chilled as explained above, will produce the pores 29 as explained above.

In Figs. 5 and 6, I have illustrated a slightly different form of apparatus highly desirable for use with a backing 30 of elastic or stretchable character. In this instance, the same adhesive supply and doctoring means as above described are utilized. A backing drum 31, corresponding to the previously described drum 14 and operating in the same way, is used and this drum has a plurality of projections 32 thereon which, as best seen in Fig. 6, are illustrated as being pyramidal in shape. Preferably each of the projections 32 terminates in a relatively blunt apex 33. In other words, the pyramids are provided with miniature flat tops, rather than sharp points. Consequently, these pyramids do not penetrate through an absorbent covering 34 on the drum, which corresponds to the above described covering 16. However, they are effective to distort or deviate not only the covering, but the elastic backing 30 as well, as indicated at 35 in Fig. 5. These deviations in the backing sheet will be of larger size than the deviations formed by the relatively sharp points 25 on the drum as previously described, and thus produce larger apertures or openings in the applied adhesive mass. As also seen in Fig. 5, each deviation substantially contacts the lower edge of the doctor flange 24 so that each high spot is substantially devoid of any application of adhesive. Upon being chilled, relatively large apertures are formed in the adhesive mass, as indicated at 36 in Fig. 7 and again, each of these apertures in the mass is preferably of sufficient area to expose a plurality of interstices 37 in the backing.

In the instance of Figs. 5, 6 and 7, the backing sheet 30, being elastic, will be of a coarser weave than the backing 4 previously described. Larger apertures in the adhesive mass are therefore desirable, and in this instance there will be materially less projections per square inch on the surface of the drum 31 than was the case with the projections 25 on the surface of the drum 14. In the resultant adhesive tape, the ultimate stretching and contracting of the backing 30 will not adversely affect the apertured adhesive film thereon.

Many variations in size of the apertures or openings in the adhesive mass or spread may be made, and usually these depend upon the character of the backing utilized, as is evident from the foregoing description.

From the foregoing, it will be apparent that I have provided not only a novel method of making a porous adhesive tape, the practice of which method is extremely economical and efficient, but also a porous adhesive tape capable of adequately ventilating that which it covers, and at the same time capable of filtering out dirt or other contaminating substances that would tend to pass through the tape.

It will be understood that modifications and variations may be effected without departing from the scope of the novel concepts of the present invention.

I claim as my invention:

1. The method of making adhesive tape, including the steps of applying a relatively hot adhesive mass to one face only of the tape, and contemporaneously wetting the opposite face only of said tape with cooling water to limit the penetration by said mass and cause said mass to set sufficiently rapidly that pores are formed therein, said adhesive mass consisting essentially of a normally solid polyvinyl alkyl ether dissolved in a normally liquid polyvinyl alkyl ether.

2. The method of making porous adhesive tape, including the steps of applying a relatively hot adhesive mass to one face of a backing sheet, contemporaneously chilling the opposite face of the tape and deviating the surface of the tape to form numerous high spots therein, and doctoring the application of adhesive to leave the high spots substantially devoid of adhesive and provide apertures in the adhesive mass.

3. The method of making porous adhesive tape, including the steps of applying a relatively hot adhesive mass to one face of a backing sheet, contemporaneously chilling the opposite face of the tape and deviating the surface of the tape to form numerous high spots therein, and doctoring the application of adhesive to leave the high spots substantially devoid of adhesive and provide apertures in the adhesive mass, said mass consisting of an alkyl hydrocarbon polymer dissolved in an alkyl hydrocarbon polymer of lower molecular weight.

4. The method of making porous adhesive tape, including the steps of applying a relatively hot adhesive mass to one face of a backing sheet, contemporaneously chilling the opposite face of the tape and deviating the surface of the tape to form numerous high spots therein, and doctoring the application of adhesive to leave the high spots substantially devoid of adhesive and provide apertures in the adhesive mass, said mass consisting of two alkyl hydrocarbon polymers of different molecular weights, one being dissolved in the other.

5. The method of making porous adhesive tape, including the steps of applying a relatively hot adhesive mass to one face of a backing sheet, contemporaneously chilling the opposite face of the tape and deviating the surface of the tape to form numerous high spots therein, and doctoring the application of adhesive to leave the high spots substantially devoid of adhesive and provide apertures in the adhesive mass, said adhesive mass being a high molecular weight polyisobutylene and a lower molecular weight polyisobutylene.

6. The method of making a porous adhesive tape, including the steps of applying an adhesive mass to one face of a naturally air pervious backing sheet while deviating said sheet to form numerous high spots therein, doctoring the applied mass by rubbing off the adhesive from said high spots, and setting the mass sufficiently rapidly to form and retain apertures in the mass at said high spots.

7. The method of making a porous adhesive tape, including the steps of applying an adhesive mass to one face of a naturally air pervious backing sheet while deviating said sheet to form numerous high spots therein, doctoring the applied mass by rubbing off adhesive from said high spots, and setting the mass sufficiently rapidly to form and retain apertures in the mass at said high spots, and sizing said apertures so that each has an area equivalent to a portion of said sheet having a plurality of pores therein.

8. The method of making a porous adhesive tape, including the steps of applying an adhesive mass to one face of a woven fabric backing sheet having fine pores between the threads thereof, deviating said sheet to temporarily provide numerous high spots therein, applying an adhesive mass to said sheet between said high spots, and setting the adhesive mass sufficiently rapidly to maintain apertures in the adhesive at said high spots when the sheet is restored to flat condition.

9. The method of making a porous adhesive tape, including the steps of applying an adhesive mass to one face of a woven fabric backing sheet having fine pores between the threads thereof, deviating said sheet to temporarily provide numerous high spots therein each of an area equivalent to a portion of said sheet encompassing a plurality of pores, applying an adhesive mass to said sheet between said high spots, and setting the adhesive sufficiently rapidly to maintain apertures in the adhesive at the high spots when said sheet is restored to the flat.

10. In an adhesive tape including a naturally air pervious fabric backing having substantially uniformly distributed minute pores or interstices therethrough, and a spread of pressure-sensitive adhesive over one face of said backing enabling adherence to a body part to which applied, said adhesive spread having a pattern of numerous perforations therein to afford effective ventilation therethrough, said perforations being substantially larger than said pores or interstices and encompassing an area with respect to each such aperture exposing a portion of the backing therethrough having a plurality of the pores or interstices, the portions of the backing over the respective apertures acting to filter out particles of dirt and other contaminating substances that might otherwise reach the surface covered by the tape through the larger apertures in the adhesive spread.

References Cited in the file of this patent

UNITED STATES PATENTS

| | | |
|---|---|---|
| 1,454,362 | Winchenbaugh | May 8, 1923 |
| 2,054,115 | Abrams | Sept. 15, 1936 |
| 2,155,441 | Osborne | Apr. 25, 1936 |
| 2,415,901 | Nelson | Feb. 18, 1947 |
| 2,572,458 | Eustis | Oct. 23, 1951 |
| 2,592,801 | Hanington | Apr. 15, 1952 |
| 2,647,065 | Scholl | July 28, 1953 |
| 2,647,100 | Salditt | July 28, 1953 |
| 2,790,736 | McLaughlin | Apr. 30, 1957 |